Patented June 30, 1931

1,812,567

UNITED STATES PATENT OFFICE

FREDERIC STRASSER, OF NEW YORK, N. Y.

SOLDER FOR ALUMINUM AND ITS ALLOYS

No Drawing.   Application filed February 10, 1930.   Serial No. 427,430.

This invention relates to a new solder for aluminum and its alloys and the method of manufacturing the solder in a practical manner.

After exhaustive scientific studies and very detailed practical experiments and demonstrations the applicant has succeeded in establishing an aluminum solder which is superior to any other solder offered on the market, from a technical, physical as well as from an economical point of view.

The principal characteristics of this new solder are its solidity, corrosion proof, simplicity of application and its cheapness in comparison with the solders hitherto used. This solder can be employed with excellent results in repairing of defective or broken aluminum parts of automobiles, airplanes, airships, and so forth. It is of utmost importance, especially for airplanes and airships, that the solder is corrosion-resisting and that a perfect ligature between the solder and the broken aluminum machine parts takes place. On account of the potential difference between the solder and the aluminum, a very rapid corrosion takes place by contact with humidity by employing the hitherto used solders. To restrict this corrosion, it was necessary up to today to protect the soldered places against this danger, with paint or lacquer. The maner of application of solders hitherto used was very complicated and troublesome, especially for a layman, and in order to make the solder more easy flowing, different kinds of fluxes were used, such for instance as stearin acid, zinc chlorid, soap, sugar, paraffin, etc. In spite of all these technical shortcomings and applicating difficulties the solders hitherto in use were exceedingly expensive.

All these disadvantages are eliminated by this new aluminum solder. This solder is cast into the usual shape of handy rods of approximately 30 cm. length. By means of a small soldering lamp every layman is in a position to make repair work within the shortest time and in a durable manner.

Some of the characteristics and advantages of the new soldering process are the following:

1. The soldered places are not subject to corrosion by access of humidity, not even under influence of salt ingredients in the air or water to which airplanes, airships and other ocean-going vessels are exposed.

2. The soldered places do not need to be protected against corrosion by covering them with paints, lacquers, etc., in order to avoid or attenuate corrosion.

3. So-called fluxes as paraffin, stearin acid, zinc chlorid are unnecessary to activate the flow of the solder when applied.

4. A perfect ligature between solder and aluminum or aluminum alloy can easily be established by keeping the aluminum alloys at the same temperature as that necessary for soldering.

5. A distortion of a piece of work to be repaired by submitting it to a special heat-treatment is absolutely impossible, and even already distorted pieces, whereby greatest precision is required, as for instance by airplane crank cases, can be trued up and brought back in its original shape or position.

6. Improved and refined aluminum alloys such as duralumin, lautal, etc., can be soldered in a very durable manner without impairing or prejudicing the qualities of the aluminum alloys obtained through the refining process.

7. The material necessary for the manufacturing of the solder can easily be obtained in the United States; no mechanical, technical or physical installations which would enhance the price of the article are required, and the costs of production are very low.

The composition of the soldering alloy is as follows:

Zinc _____ 10 to 25%
Aluminum _____ 7 to 12%
Copper _____ 2 to 5%
Bismuth _____ 3 to 8%
And the rest tin.

Another composition for the solder is:
Zinc _____ 15 to 20%
Aluminum _____ 12 to 15%
Copper _____ 1 to 3%
Bismuth _____ 1 to 2%
And the rest tin.

A third composition of the solder is:

| | |
|---|---|
| Zinc | 15 to 30% |
| Aluminum | 8 to 10% |
| Copper | 2 to 3% |
| Bismuth | 2 to 3% |
| Antimony | 1 to 4% |

And the rest tin.

The melting point of the solder is about 220° C.

The following is a method of producing the solder:

The necessary amount of aluminum is first heated and melted until it shows a rose color. Thereupon copper is added under light stirring. The other ingredients are then added under continuous stirring and in the order of their melting points, that is to say, the bismuth is added next after the copper and then tin and zinc. When antimony is used this is added between the copper and the bismuth. Each single metal component must, however, be added during continuous stirring of the entire mass.

Graphite crucibles are best suitable for melting vessels. Directly all metal components are completely molten, the whole mass is again heated as much as possible and then cast. The molds used for casting may be of any metal as the cooling action in no wise has any disadvantageous influence on the procedure of this new soldering material.

Some practical uses of this solder will here be given:

Supposing that a break in a cylinder of the motor of an automobile or an airship has occurred; the entire cylinder is then heated by a blow-pipe or welding lamp in order to remove rests of oil, gasoline or other fat-containing substances. The spot flame from the lamp is then centered upon one of the broken surfaces while testing with the soldering bar to find if said surfaces are sufficiently heated so that they will accept the solder, that is to say, that the tinning condition exists. Thereupon the actual broken surfaces are smeared with the soldering bar and then the parts solidly pressed together by means of clamps or the like, after previously having ascertained that the two broken parts have been properly matched, whereupon the repaired cylinder body is left to cool.

In order to remove unnecessary remnants of solder the joint portions may be again slightly heated and brushed with a steel brush until the surfaces are smooth. Repair of the cylinder is then completed. In order to repair plates and similar flat pieces the following procedure is advocated:

The broken surfaces of the two parts are preferably beveled so that they may be accurately joined together in order to take their original shape and length. The pieces are thereupon heated, the parts then tested as regards suitable heat with the soldering bar and when the condition arises at which the solder starts to melt the existing groove between the beveled surfaces is filled in with solder.

In this manner it is possible to avoid the danger of shortening the repaired piece and regain the original length thereof when joining the broken parts. Even in the case where the surfaces of the broken parts do not again come into contact with each other, it is possible to obtain a mathematically correct and serviceable shape and length of the repaired piece and to assure durability thereof.

In accordance with numerous tests made with this soldering material its tensile strength has been established to be from 12 to 15 kilograms per square millimeter (7.56 to 9.45 tons per square inch).

Electrolytic conditions of the solder and the soldered joints are as follows:

Potential measurements, which were made with common solders in 0.1% $H_2SO_4$, $$\frac{1}{1000} Al_2(SO_4)_3$$

and a solution of $$\frac{1}{200} HCl, \frac{1}{1000} Al_2(SO_4)_3$$

resulted in differences of 0.27 to 0.44 volts as compared with the potential of the aluminum in these solutions.

Adequate measurements with applicant's solder as compared with the aluminum resulted in potential differences of 0.02 to 0.05 volts on in other words, about one-tenth part.

It is evident that many changes in the composition of this solder may be made under the scope of the claims and that the same may be varied widely without departing from the spirit of the invention.

I claim:

1. A solder for articles of aluminum and aluminum alloys containing 10 to 30% zinc, 7 to 15% aluminum, 1 to 5% copper and 1 to 8% bismuth and the rest tin.

2. A solder for articles of aluminum and aluminum alloys containing 10 to 30% zinc, 7 to 15% aluminum, 1 to 5% copper, 1 to 4% antimony and 1 to 8% bismuth and the rest tin.

3. A solder for articles of aluminum and aluminum alloys containing approximately the metals in the following proportions: tin 50%, zinc 25%, aluminum 12%, copper 5% and bismuth 8%.

In testimony whereof I affix my signature.

FREDERIC STRASSER.